(12) United States Patent
Schnadwinkel et al.

(10) Patent No.: US 11,453,557 B2
(45) Date of Patent: Sep. 27, 2022

(54) CONVEYOR SYSTEM AND METHOD FOR CONVEYING GOODS

(71) Applicant: Dürkopp Fördertechnik GmbH, Bielefeld (DE)

(72) Inventors: Thomas Schnadwinkel, Steinhagen (DE); Doris Elebracht, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 0 days.

(21) Appl. No.: 17/220,697

(22) Filed: Apr. 1, 2021

(65) Prior Publication Data

US 2021/0221623 A1 Jul. 22, 2021

Related U.S. Application Data

(63) Continuation of application No. 16/682,096, filed on Nov. 13, 2019, now Pat. No. 11,072,498.

(30) Foreign Application Priority Data

Nov. 15, 2018 (DE) ...................... 10 2018 219 583.8

(51) Int. Cl.
| | |
|---|---|
| *B65G 37/02* | (2006.01) |
| *B07C 3/08* | (2006.01) |
| *B65G 9/00* | (2006.01) |
| *B65G 19/02* | (2006.01) |
| *B65G 47/57* | (2006.01) |
| *B65G 47/61* | (2006.01) |

(52) U.S. Cl.
CPC .............. *B65G 37/02* (2013.01); *B07C 3/087* (2013.01); *B65G 9/002* (2013.01); *B65G 19/025* (2013.01); *B65G 47/57* (2013.01); *B65G 47/61* (2013.01); *B65G 2205/04* (2013.01); *B65G 2207/14* (2013.01); *B65G 2812/012* (2013.01)

(58) Field of Classification Search
CPC ...... B65G 37/02; B65G 9/002; B65G 19/025; B65G 47/57; B65G 47/61; B65G 2205/04; B65G 2207/14; B65G 2812/012; B07C 3/087
See application file for complete search history.

(56) References Cited

U.S. PATENT DOCUMENTS

| | | | | |
|---|---|---|---|---|
| 1,721,095 | A | * 7/1929 | Southwick | ................ B41B 3/00 199/50 |
| 2,992,721 | A | 7/1961 | Orville | |
| 3,357,539 | A | * 12/1967 | Naslund | ................ B65G 47/53 198/370.05 |
| 3,448,870 | A | 6/1969 | Gallo et al. | |

(Continued)

FOREIGN PATENT DOCUMENTS

| | | |
|---|---|---|
| AT | 509 169 A2 | 6/2011 |
| DE | 2611556 C2 | 9/1976 |

(Continued)

*Primary Examiner* — James R Bidwell
(74) *Attorney, Agent, or Firm* — McGlew and Tuttle, P.C.

(57) ABSTRACT

A conveyor system for conveying goods having a lying conveyor for conveying the goods horizontally, where the lying conveyor includes a sorting device with multiple delivery points, and having an overhead conveyor, by way of which the goods are conveyed in a suspended manner on a goods carrier, where the overhead conveyor is connected to at least one of the delivery points for delivering the goods.

23 Claims, 12 Drawing Sheets

(56) References Cited

U.S. PATENT DOCUMENTS

| | | | | |
|---|---|---|---|---|
| 3,977,513 | A | * | 8/1976 | Rushforth ............ B65G 47/962 |
| | | | | 414/339 |
| 5,570,773 | A | | 11/1996 | Bonnet |
| 5,687,850 | A | * | 11/1997 | Speckhart ................ B07C 5/36 |
| | | | | 209/2 |
| 9,738,450 | B2 | | 8/2017 | Lyon et al. |
| 11,072,498 | B2 | * | 7/2021 | Schnadwinkel ....... B65G 37/02 |

FOREIGN PATENT DOCUMENTS

| | | |
|---|---|---|
| DE | 3104740 A1 | 11/1981 |
| DE | 10 2008 026 720 A1 | 12/2009 |
| DE | 102014203298 A1 | 8/2015 |
| DE | 102016109310 A1 | 11/2017 |
| DE | 102016208866 A1 | 11/2017 |
| EP | 0099434 A2 | 2/1984 |
| EP | 2196415 A2 | 6/2010 |
| EP | 2418160 A1 | 2/2012 |
| EP | 3180274 A1 | 6/2017 |
| EP | 3354605 A1 | 8/2018 |
| JP | 2001-253 515 A | 9/2001 |
| WO | 2005/097633 A1 | 10/2005 |
| WO | 2016/023869 A2 | 2/2016 |
| WO | 2017015681 A1 | 2/2017 |
| WO | 2018/130712 A2 | 7/2018 |
| WO | 2018142242 A1 | 8/2018 |
| WO | 2018142243 A1 | 8/2018 |

\* cited by examiner

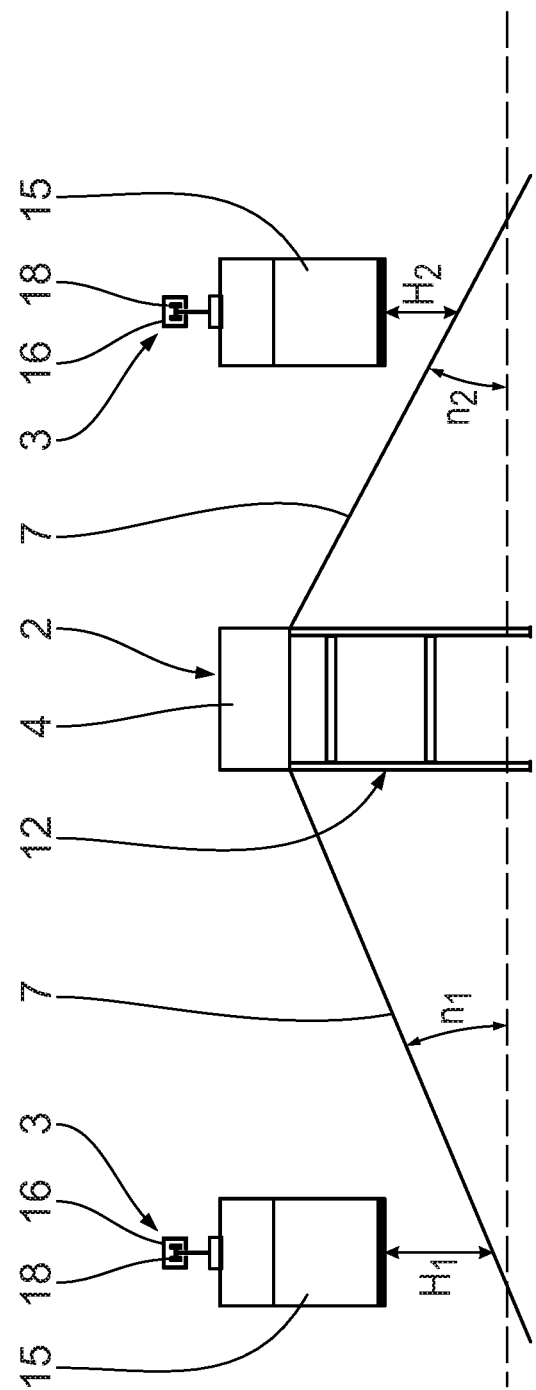

CONVEYOR SYSTEM AND METHOD FOR CONVEYING GOODS

CROSS REFERENCE TO RELATED APPLICATIONS

This application is a continuation under 37 CFR 1.53(b) of pending prior U.S. patent application Ser. No. 16/682,096 filed on Nov. 13, 2019, which claims the priority of German Patent Application Serial No. DE 10 2018 219 583.8 filed on Nov. 15, 2018, the entire contents of each application are incorporated herein by reference.

TECHNICAL FIELD

The invention relates to a conveyor system and to a method for conveying goods, in particular for conveying goods with different conveying characteristics.

TECHNICAL BACKGROUND

Various conveyor systems are known for conveying and sorting goods. For large, heavy goods, a lying conveyor with a sorter, for example, serves for conveying the goods in a sorted manner to various delivery points of the conveyor system.

SUMMARY

It is the object of the present invention to improve the conveying, in particular the sorting, of goods, in particular to make it possible to convey different types of goods in one conveyor system, and, in particular, to increase the throughput of goods of, in particular, existing conveyor systems.

Said object is achieved according to the invention by a conveyor system for conveying goods having a lying conveyor for conveying the goods lying on the lying conveyor, wherein the lying conveyor comprises a sorting device with multiple delivery points, and an overhead conveyor, by way of which the goods are conveyed in a suspended manner on a goods carrier, wherein the overhead conveyor is connected to at least one of the delivery points for delivering the goods.

Furthermore, this object is achieved according to the invention by a method for conveying goods including the method steps convey the lying goods by means of a lying conveyor which comprises a sorting device with multiple delivery points, convey the goods in a suspended manner by means of an overhead conveyor to at least one of the delivery points, deliver the goods that have been conveyed in a suspended manner to the at least one delivery point.

It has been recognized according to the invention that it is possible, in an advantageous manner, to combine a lying conveyor, which serves to convey goods horizontally, with an overhead conveyor, which serves for conveying goods which are suspended on a goods carrier, in one conveyor system. The conveying includes, in particular, the sorting of the goods. Such a conveyor system is, for example, a conveyor system for conveying and sorting individual goods which are conveyed separated into singles. Such a system serves, for example, for picking individual goods from a warehouse for orders at a goods outward point. Such a conveyor system can also be a distribution center for postal items. It has been recognized that it is possible to retrofit, in particular, an already existing conveyor system with a lying conveyor in an advantageous manner with an overhead conveyor to form a conveyor system according to the invention.

The lying conveyor serves, in particular, for conveying lying conveyor goods. Lying conveyor goods are, in particular, large, heavy goods which are not able to be conveyed in a suspended manner or can only be conveyed in a suspended manner laboriously, such as, for example, large cartons. The lying conveyor goods are conveyed horizontally either directly on the lying conveyor, in particular on a conveyor belt, or in a conveying container which is arranged, in particular, on the conveyor belt. The lying conveyor comprises a sorting device with multiple delivery points at which the goods can be provided in a sorted manner. A sorter, for example a crossband sorter (also known as a cross belt sorter in English), a tilt tray sorter, a shoe sorter or a push tray sorter can be used as a sorting device for the lying conveyor. Such a sorter comprises, in particular, its own mechanism which serves for unloading the goods. The unloading of the goods can also be effected by way of classic conveyor technology components, such as, for example, a pusher, in place of a sorter.

Overhead conveyor goods, in particular, are conveyed with the overhead conveyor. Overhead conveyor goods are, in particular, small, light goods, in particular letters, postal items and small, light packages. Overhead conveyor goods can also be packaged textiles, in particular, packaged clothing. Overhead conveyor goods can also be goods which cannot be reliably conveyed by horizontal conveying, such as, for example, round goods.

It has been found that when the overhead conveyor is connected to at least one of the delivery points of the lying conveyor to deliver the goods, the performance of the conveyor system can be increased. The overhead conveyor goods can be delivered directly from the goods carrier to one of the delivery points. On account of gravity, the overhead conveyor goods can fall from the goods carrier of the overhead conveyor onto the lying conveyor situated, in particular, below it. The goods are conveyed, in particular, between the overhead conveyor and the lying conveyor on account of gravity. The goods can be delivered, in particular in a controlled manner, from the overhead conveyor to the delivery points. In particular, the goods can be delivered from the overhead conveyor to the delivery points in an automated manner. It is, in particular, possible to divide the goods streams into lying conveyor goods and overhead conveyor goods, the majority of the small products being conveyed as overhead conveyor goods with the overhead conveyor.

The sorting device can be operated at a low conveying speed so that along a conveyor portion of the sorting device, that is to say the delivery points, it is possible to arrange the goods packed tighter and consequently closer together. The conveyor system makes possible a high goods throughput on the one hand and a high density of delivery points on the other hand.

It has also been recognized that as a result of combining the lying conveyor with the overhead conveyor, the spectrum of goods to be conveyed in the conveyor system is expanded. In particular, the overhead conveyor is arranged in a spatial region of the conveyor system which is not utilized for operating the lying conveyor. Additional space required for the overhead conveyor is not necessary. The conveyor system according to the invention is constructed in a compact manner.

The overhead conveyor comprises a conveyor rail which predetermines an overhead conveyor direction, along which the overhead conveyor goods are conveyed. A goods carrier is conveyed along the conveyor rail. The conveying can be effected passively, in particular due to gravity, by the conveyor rail being arranged, at least in portions, with a gradient, inclined in relation to the horizontal. An angle of inclination of the gradient is in particular at least 3°, in particular at least 5° and in particular at least 7°. In addition to this or as an alternative to it, the conveying of the goods carriers along the conveyor rail can be effected in a driven manner, in particular by means of an endlessly circulating conveyor chain or by means of multiple conveyor chains, each of which circulate and entrain the goods carriers.

An arrangement of the overhead conveyor extending at least in regions above the at least one delivery point enables a particularly compact realization of the conveyor system. It has been found that, in particular, the installation space arranged above the delivery points in the case of a lying conveyor is unutilized and the overhead conveyor can be arranged advantageously in said region in order to connect the overhead conveyor to the delivery points using conveying technology. The goods from the overhead conveyor can be delivered in a particularly advantageous manner onto the delivery points from above.

In addition to this or as an alternative to it, it is possible for the overhead conveyor to extend laterally to the delivery points and/or the goods to be delivered to the delivery points laterally from the overhead conveyor.

The realization of the goods carrier as a transport pocket in particular, so as to be emptiable, enables goods to be transported in a particularly reliable and advantageously automatable manner on the overhead conveyor. Transport pockets which are conveyed in a suspended manner are known from overhead conveying technology. The transport pocket is conveyed in a rolling manner on the conveyor rail by means of a so-called rolling adapter. Such a transport pocket is disclosed in DE 10 2008 026 720 A1, the entire contents of which are incorporated herein by reference. It is advantageous when the transport pocket is realized so as to be automatically emptiable. To this end, the transport pocket can be arranged so as to be tippable or pivotable in order to empty out the goods via an upper and/or lateral opening. The transport pocket can also be turned inside out for delivering the goods. The transport pocket can also comprise a delivery opening in the region of a rear wall, through which opening the goods can be delivered to the delivery point. It is conceivable as an alternative to this for the transport pocket, in particular in the region of the pocket floor, to be realized so as to be openable and to be opened in the region of the delivery point, in particular when moving past the delivery point, in particular automatically, and for the goods to fall out of the transport pocket, in particular downward. The transport pocket comprises, in particular, an openable and reclosable part, a delivery opening being formed in the opened arrangement, through which the goods fall downward, in particular on account of gravity, out of the transport pocket.

In place of the transport pocket, the goods carrier can also be realized as a carrier label which comprises an opening for a hook or an openable retaining element, such as, for example, a snap hook, which is conveyed in a suspended manner on the conveyor rail. The opening forms an eye of the carrier label. The carrier label is fastened, in particular glued, in particular to the goods themselves and/or to the packaging of the goods. For delivering the goods from the overhead conveyor at the delivery point, the carrier label is released from the hook or from the openable retaining element, in particular by pivoting the hook or by opening the retaining element and unhooking the carrier label and/or by cutting or destroying the carrier label by means of a cutting device, in particular a mechanical cutting device or a thermal cutting device.

As an alternative to this, the carrier label can also be conveyed in a clamping manner on a clamping element. In this case, the carrier label can be realized without an opening. The clamping element itself can be realized so as to be displaceable on the conveyor rail of the overhead conveyor. As an alternative to this, the clamping element can be conveyed in a suspended manner on the hook. At the delivery point, the clamping element is opened manually or in an automated manner for delivering the overhead conveyor goods.

The rotatable, in particular rotationally driveable realization of a transport pocket about a vertical axis, enables improved delivery of the goods to the delivery points. A passive element, in particular in the form of a stop, can be arranged in the region of the delivery points along the overhead conveyor so that the transport pocket is rotated about the vertical axis by the stop when moving past. In addition to this or as an alternative to it, the transport pocket can also comprise an active rotary drive which enables the transport pocket to be rotated about the vertical axis in the region of the delivery points.

With at least one feed point the goods can be fed, in particular centralized, onto the lying conveyor and/or onto the overhead conveyor. In particular, when the goods are fed to the delivery location, a decision can be made manually and/or in an automated manner as to whether the goods are fed onto the lying conveyor or the overhead conveyor.

An overhead conveyor feed point enables the decentral arrangement of a specialized feed point. At the overhead conveyor feed point, which can be arranged, in particular, at a large distance from a central feed point, exclusively overhead conveyor goods are fed onto the overhead conveyor. Said feed can be effected, in particular, in an automated manner. It has been recognized that the goods, in dependence on the type of goods, are stored at different locations in a conveyor system and provided for the feed. Small goods, in particular, which are suitable as overhead conveyor goods, can be arranged at a physical distance, in particular at a large physical distance of between 20 m and 1,000 m, in particular between 100 m and 500 m, from the lying conveyor and can be conveyed to the delivery points in an uncomplicated manner by means of the overhead conveyor.

At least one overhead conveyor delivery point, at which exclusively overhead conveyor goods are delivered from the overhead conveyor, in addition to the delivery points of the sorter enables an improved and in particular direct automated delivery, in particular of small products, for example postbags or containers.

The realization of the delivery points as a ramp, in particular as an inclined ramp and/or a driven, in particular non-inclined, ramp for conveying the goods to the delivery points opens up installation space for the overhead conveyor directly above the ramp, in particular in the region of an outlet, at the feed points. The ramps are connected to a conveyor portion of the lying conveyor by way of a first end and comprise a gradient directed toward a second end and/or a ramp drive. The goods are delivered at the second end of the ramp, which is arranged opposite the conveyor portion. The goods are conveyed along the ramp away from the conveyor unit toward the delivery point.

A braking element at the delivery points which is provided for the goods, ensures reliable delivery of the goods at the delivery points, in particular of the overhead conveyor goods from the overhead conveyor. The braking element causes the delivery speed, at which the overhead conveyor goods are delivered, to be braked. The delivery speed is, in particular, a speed of fall.

The conveyor rail of the overhead conveyor comprises at least one conveyor strand which extends along the delivery points, in particular along all delivery points of the sorter. In particular, the delivery points are connected together sequentially by means of the overhead conveyor. The goods carriers are guided along to all delivery points on the overhead conveyor in the overhead conveyor direction. In the case of this realization, it is sufficient when the overhead conveyor comprises precisely one conveyor strand. The system and investment costs for such an overhead conveyor are reduced. In order to increase the conveying rates, that is to say the throughput of the goods, multiple conveyor strands side by side can connect the delivery points sequentially.

In addition to this or as an alternative to it, an overhead conveyor can be realized in such a manner that each conveyor strand is connected to a group of delivery points using conveyor technology. A group of delivery points can comprise one or more delivery points. In the case of a cross belt sorter where the ramps extend to the delivery points on both sides, a first group of delivery points, for example, can be arranged on the left-hand side and a second group of delivery points on the right-hand side of the conveyor portion. One or multiple conveyor strands can be provided for each group of delivery points in order to connect said delivery points using conveyor technology. It is also conceivable to divide the connection between the delivery point and the conveyor strands of the overhead conveyor logically, for example to combine delivery points which are assigned to a specific customer, or to combine delivery points to which specific goods are fed. The groups of delivery points can comprise a different number of delivery points.

A design of the conveyor system configured such that it comprises a lying conveyor basic structure, by way of which the lying conveyor, in particular a conveyor portion and/or the ramps, is/are supported on the floor, wherein the overhead conveyor is supported on the lying conveyor basic structure, is sturdy and material-efficient. A separate basic structure for an overhead conveyor is unnecessary.

An at least one delivery storage element is provided at each delivery point for the overhead conveyor goods, enables goods to be delivered at the delivery point to be stored intermediately at least in a temporary manner. A delivery storage element can be, for example, an additional ramp and/or a net which is arranged above the ramp of the delivery point; when goods are delivered from the overhead conveyor in the region of the delivery point, they fall onto the delivery storage element and are stored there intermediately. It is conceivable to forward the goods from the delivery storage element, for example in a time-controlled or sensor-controlled manner, to the ramp and to the delivery point. It is also conceivable for the delivery storage element to comprise a delivery opening, via which the goods can be delivered directly at the delivery point. In the case of said variant, the delivery point comprises an additional delivery possibility. It is possible for multiple delivery storage elements to be provided per delivery point, in particular multiple delivery possibilities at the delivery point.

A delivery storage element can also be realized in the form of a pivotable flap which enables alternately either lying conveyor goods from the lying conveyor or overhead conveyor goods from the overhead conveyor to be conveyed via the ramp to the delivery points. The respectively other goods are prevented from being conveyed to the ramp by the pivoted flap. As a result, subgroups of goods to be delivered at the delivery point can be formed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a view corresponding to FIG. 3 of a further embodiment with variously inclined ramps;

DESCRIPTION OF PREFERRED EMBODIMENTS

Figure 1:
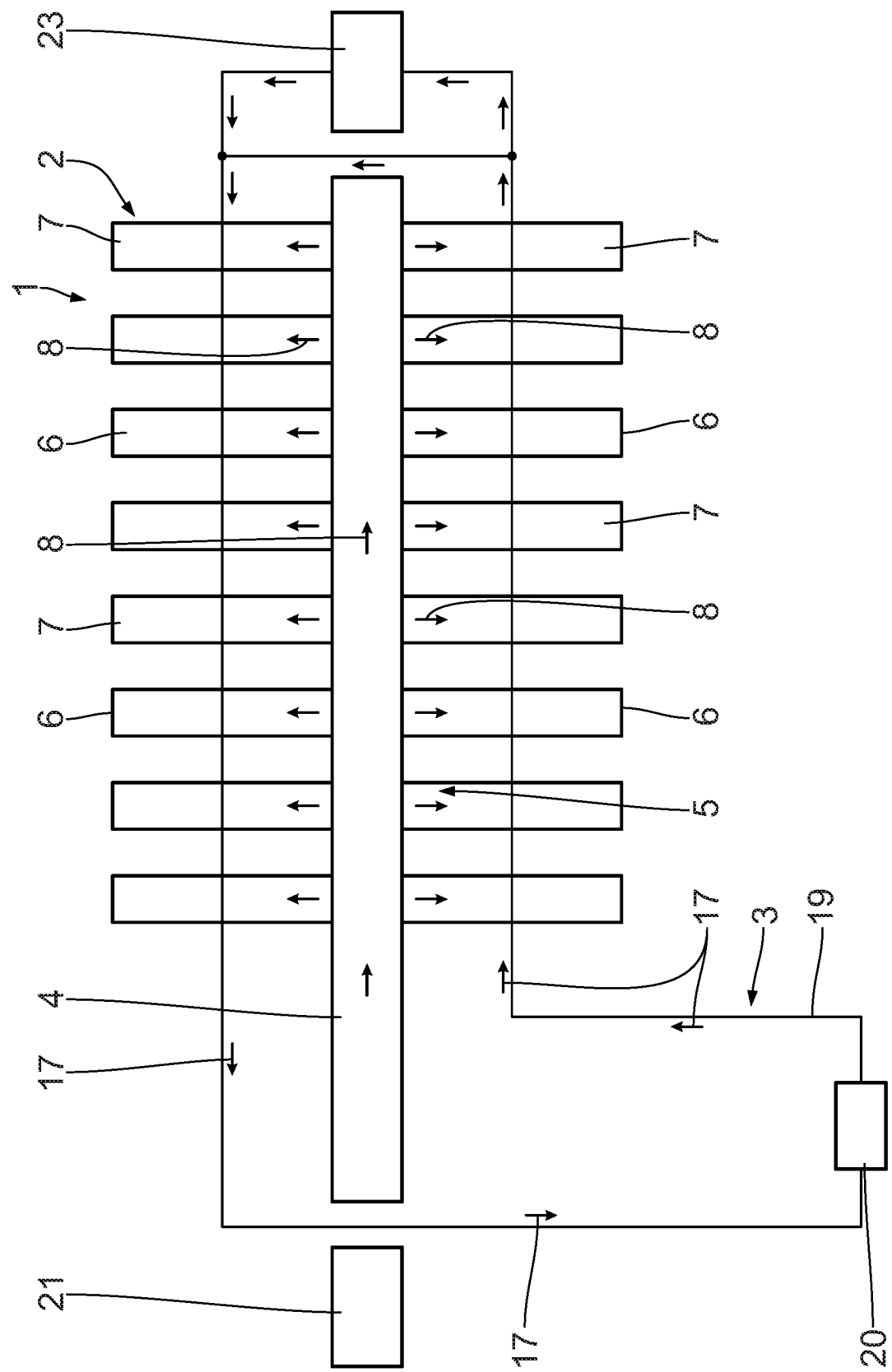
FIG. 1 is a schematic view of a first embodiment of a conveyor system with an overhead conveyor which comprises one conveyor strand which connects delivery points together sequentially.
Figure 2:
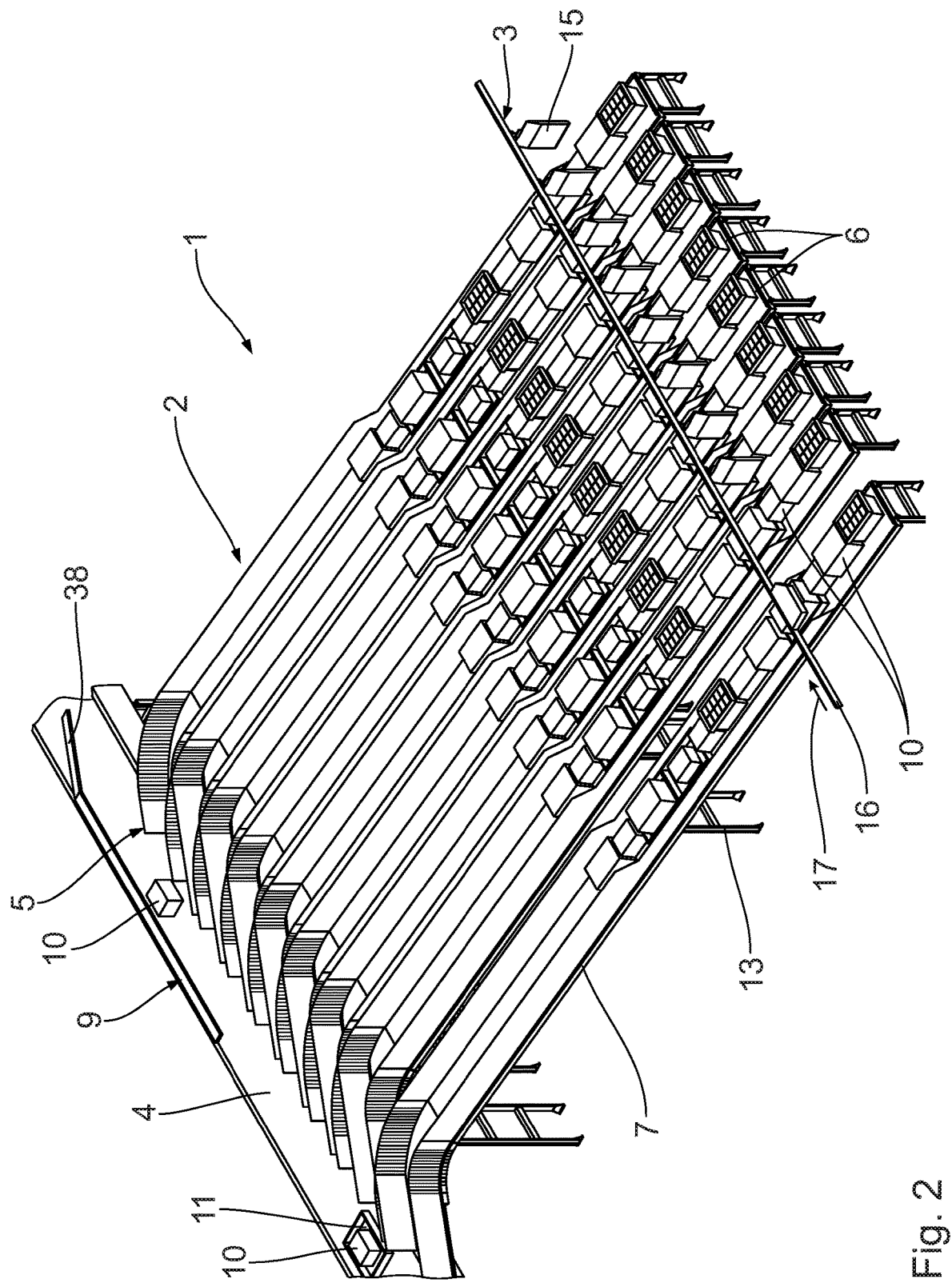
FIG. 2 is a perspective, enlarged view of a conveyor system according to FIG. 1.

A conveyor system designated as a whole in FIGS. 1 to 4 by way of the reference symbol 1 includes a lying conveyor 2 and an overhead conveyor 3.

Goods, in particular lying conveyor goods, are conveyed horizontally using the lying conveyor 2. To this end, the lying conveyor 2 comprises a conveyor portion 4 in the form of a conveyor belt. In addition, the lying conveyor 2 comprises a sorter 5 with multiple delivery points 6. According to the exemplary embodiment shown, the sorter 5 is realized as a shoe sorter. Other embodiments are also possible for the sorter 5. The delivery points 6 are arranged in each case at a free end of a ramp 7. The ramps 7 are connected in each case to the conveyor portion 4 using conveyor technology.

According to the exemplary embodiment shown, eight ramps 7 extend on each side along the conveyor portion 4 transversely, in particular perpendicularly, to a conveyor portion conveying direction 8. The sorter 5 comprises a total of sixteen delivery points 6. Unloading elements 9 are arranged on the conveyor portion 4 in the form of unloading mechanisms, so-called shoes, which unload the lying conveyor goods 10 conveyed along the conveyor portion 4 in a controlled manner to the respective ramp 7. The unloading elements 9 are transferred by means of a motion link, not shown, into a delivery arrangement 38 which extends transversely to the conveyor portion conveying direction 8 and enables the lying conveyor goods 10 to be passively guided in a forcible manner to the respective ramp 7. The unloading elements 9 are displaceable, in particular, along the conveyor portion conveying direction 8 and/or transversely thereto in order to carry out the unloading of the lying conveyor goods 10 onto the respective ramp 7.

The lying conveyor goods 10 can be arranged directly on the conveyor belt of the conveyor portion 4. Conveying containers, for example a conveying basket 11, can also be provided for the transport of the lying conveyor goods 10. The conveying basket 11 is also designated as a tray.

The ramps 7 of the lying conveyor 2 are arranged in an inclined manner, according to the exemplary embodiment shown, at an angle of inclination n compared to the horizontal. The angle of inclination n is dimensioned, in particular, in such a manner that the lying conveyor goods are able to be conveyed automatically along the ramps 7 to the respective delivery point 6 as a result of gravity. According to the exemplary embodiment shown, the angle of inclination n is 7°. It is advantageous when the angle of inclination is at least 3°, in particular at least 5° and in particular at least 7°, in order to ensure blockage-free conveying produced by gravity. It is also advantageous when the angle of inclination n is less than 20°, in particular less than 15° and in particular less than 10° so that the dynamic pressure on the respectively front-most lying conveyor goods arranged at the delivery point 6 does not become too great.

The lying conveyor 2 comprises a lying conveyor basic structure 12 which includes, in particular, a plurality of modular support elements 13. The support elements 13 are realized, in particular, so as to be vertically adjustable in order to adjust the angle of inclination n of the ramps 7 in a variable manner. The lying conveyor 2 is supported on the floor 14 by way of the lying conveyor basic structure 12. It is advantageous when the overhead conveyor 3 is also supported on the lying conveyor basic structure 12. It is, in particular, unnecessary to provide a separate basic structure for the overhead conveyor. Such an overhead conveyor 3 can advantageously be fitted in retro on an already existing lying conveyor 2.

The goods are conveyed in a suspended manner on a goods carrier with the overhead conveyor 3. According to the exemplary embodiment shown, the goods carrier is realized as a transport pocket 15. The transport pocket 15 is displaceable by means of a rolling adapter 18, not shown in any more detail, along a conveyor rail 16 of the overhead conveyor 3 along an overhead conveyor direction 17. According to the exemplary embodiment shown, the overhead conveyor 3 comprises an overhead conveyor drive, not shown, which is realized, in particular, in the form of an endlessly circulating, driven conveyor chain, by way of which the rolling adapters 18, on which the transport pockets 15 are conveyed in a suspended manner, are driven.

According to the exemplary embodiment shown, the overhead conveyor 3 is realized with one single conveyor strand 19 which is predetermined by the conveyor rail 16. An overhead conveyor feed point 20, at which the overhead conveyor goods 25 are fed to the overhead conveyor 3, is arranged along the conveyor strand 19. Overhead conveyor goods 25 are in particular small, light goods, for example shipping bags, in particular envelopes, jiffy envelopes and/or so-called polypockets, small parcels or cartons. The conveyor strand 19 is realized as an endlessly circulating conveyor strand and extends sequentially to the individual delivery points 6 of the sorter 5. According to the exemplary embodiment shown, all delivery points 6 of the sorter 5 are connected to the conveyor strand 19 via the ramps 7 using conveyor technology. The conveyor strand 19 enables the delivery of overhead conveyor goods to any arbitrary delivery point 6 of the conveyor system 1.

It is conceivable to supplement the conveyor strand 19, in particular in the region of the ramps 7, by additional conveyor strands in order to increase the throughput of the goods for the overhead conveyor 3.

An overhead conveyor feed point 20 is arranged at a distance away from the sorter 5 and in particular from the delivery points 6. In particular, the overhead conveyor feed point 20 can be arranged adjacent to a storage location, for example a receiving point for the overhead conveyor goods 25, such as, for example a lorry ramp, at which the overhead conveyor goods are stored. In particular, the overhead conveyor feed point 20 can be a feed point which is specially for overhead conveyor goods, at which the overhead conveyor goods, in particular in an automated manner, are loaded into the transport pockets 15.

The conveyor system 1 additionally comprises a feed point 21 at which goods, for example from a warehouse and/or a receiving point for the overhead conveyor goods 25, such as, for example, a lorry ramp, are delivered to the lying conveyor 2 or the overhead conveyor 3. The feed point 21 is arranged, in particular, in a region of the conveyor system 1 in which the lying conveyor 2 and the overhead conveyor 3, in particular conveyor portion 4 and the conveyor strand 19, intersect. At the feed point 21, an operator can deliver the goods, for example controlled by a display or a marking on said respective goods, onto the overhead conveyor 3 or the lying conveyor 2.

Figure 3:
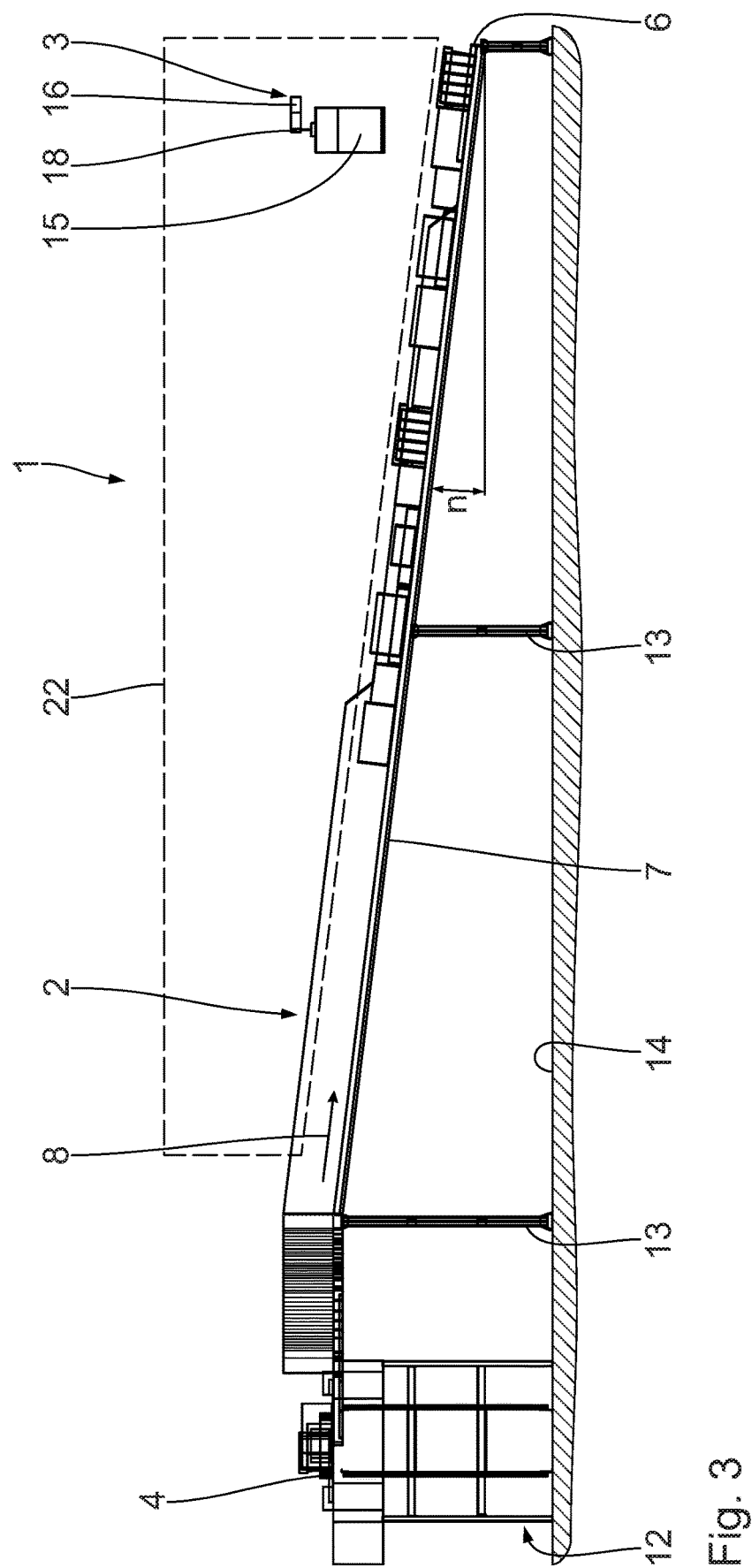
FIG. 3 is a side view of the conveyor system according to FIG. 2.
Figure 4:
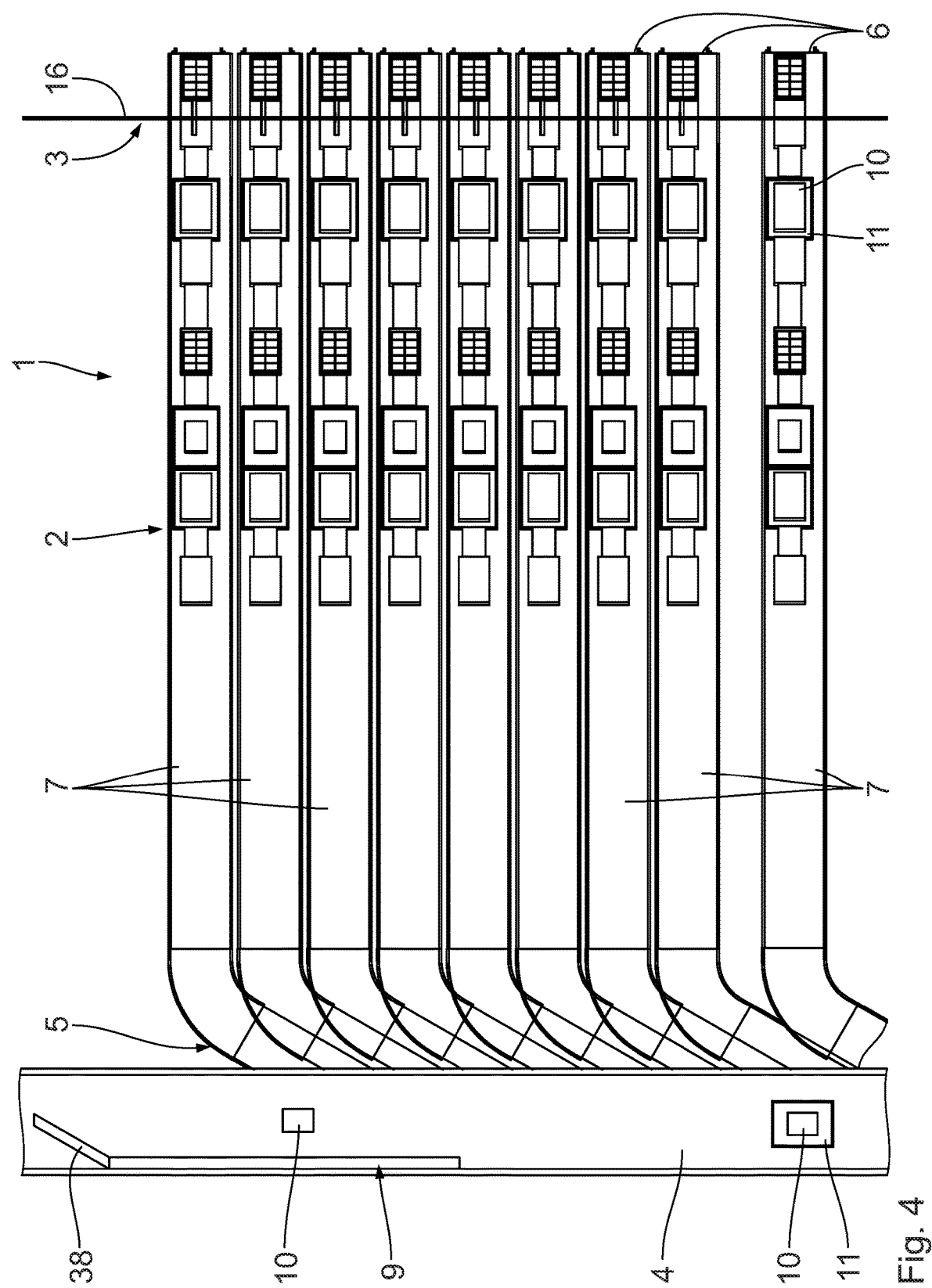
FIG. 4 is a top view of the conveyor system according to FIG. 2.

By the ramps 7 being realized in a downwardly inclined manner, there is a virtual installation space 22 which is indicated schematically in FIG. 3. The virtual installation space 22 is realized in a profiled manner with a trapezoidal cross section which extends along the overhead conveyor direction 17. The virtual installation space 22 extends in a vertical direction beyond the overall height of the sorter 5 in order to create additional installation space for carrying out maintenance and/or repair work on the overhead conveyor 3. The accessibility of the overhead conveyor 3 from above is improved as a result. It is advantageous for the overhead conveyor 3 to be arranged within said virtual installation space 22. This means, in particular, that no additional installation space is required for supplementing or fitting an existing lying conveyor 2 in retro with an overhead conveyor 3 to form a conveyor system 1 according to the invention.

According to the exemplary embodiment shown, the conveyor system 1 comprises an overhead conveyor delivery point 23 which exists in addition to the delivery points 6 of the sorter 5. The overhead conveyor delivery point 23 can be arranged in the conveyor system 1, in particular, at a distance away from the sorter. In particular, exclusively overhead conveyor goods are delivered from the overhead conveyor 3 at the overhead conveyor delivery point 23. Delivery to the overhead conveyor delivery point 23 is effected, in particular, directly in dispatch containers such as postbags or crates.

According to the exemplary embodiment shown, the transport pockets 15 are realized in such a manner that they are emptiable, in particular emptiable in an automated manner, in order to be able to deliver the overhead conveyor goods in an automated manner in the region of the delivery points. To this end, the transport pocket 15 can comprise, for example on a rear wall, a delivery opening, through which the overhead conveyor goods are delivered from the transport pocket 15 and are able to fall, as a result of gravity, onto the ramp 7 arranged below. The transport pocket 15 can also be realized so as to be openable, in particular in a bottom region of the transport pocket 15, in order to be able to deliver the overhead conveyor goods 25 onto the ramp 7 as a result of said goods falling out of the transport pocket.

A method for conveying different goods is explained in more detail below by way of FIGS. 1 to 4.

The goods 10, 25 are conveyed from goods receipt, not shown, to the feed point 21 and are fed there by an operator to the lying conveyor 2 or the overhead conveyor 3. The goods 10, 25 can be identified correspondingly for this purpose in order to predetermine the corresponding conveyor 2, 3 for the operator. The identification can also be stored, for example, in the form of a barcode which is attached to the goods, the operator scanning the barcode and receiving corresponding information on a display element. The identification can also be stored in an identification data carrier, for example an RFID chip which is arranged on the goods themselves, on the transport pocket 15 or in the packaging of the goods. The information can be displayed for the operator on a display device by means of a corresponding transponder reader. The goods can also be optically identified, in particular supported by cameras. It is also conceivable for the operator to decide himself whether the respective goods are to be delivered onto the lying conveyor 2 or the overhead conveyor 3. In this case, the goods are manually identified.

The goods delivered onto the lying conveyor 2 are lying conveyor goods 10 which are each fed by means of the unloading elements 9 to a ramp 7 and are made available to a further operator at the delivery points 6. At the delivery points 6, the goods 10 can be prepared for dispatch or supplied for order picking.

The goods which have been fed to the overhead conveyor 3 either at the feed point 21 and/or the overhead conveyor feed point 20, are guided along the conveyor rail 16 to the ramps 7 and are conveyed away above the ramps 7. By means of an emptying device, not shown in any further detail, the transport pockets 15 are emptied in a controlled manner by a control unit which is not shown. The overhead conveyor goods 25, conveyed in the transport pocket 15, fall out of the transport pocket 15 down onto the ramp 7 situated below in each case as a result of gravity. The emptying of the transport pocket 15 is effected, in particular, in an automated manner and without interrupting the conveying movement of the overhead conveyor 3. The transport pocket 15 is therefore emptied as it moves past. The emptied conveyor pocket 15 is returned again along the conveying direction 16 and can be provided with goods again at the feed point 21 and/or the overhead conveyor feed point 20. The conveyor system 1 makes it possible to convey and to sort the most varied types of goods in one and the same conveyor system.

The transport pocket 15 can also be conveyed to the overhead conveyor delivery point 23 and, there, can be emptied, in particular in an automated manner.

FIG. 5 shows a further realization of a lying conveyor 2. Components which correspond to those already explained above with reference to FIGS. 1 to 4 bear the same reference numerals and will not be discussed again in detail.

In the case of the lying conveyor 2, the two oppositely arranged ramps 7 are arranged at different angles of inclination n1 and n2. It is in particular advantageous when the respective angle of inclination $n_1$ or $n_2$ of the ramps 7 is variably adjustable by, for example, the support elements 13 being realized so as to be variably height-adjustable. The different angles of inclination $n_1$, $n_2$ result in different drop heights $H_1$, $H_2$. The vertical distance between the bottom edge of the transport pocket 15 and the ramp 7 is designated as the drop height H. The smaller the drop height H, the smaller the risk of damage and/or destruction to the overhead conveyor goods.

Figure 7:
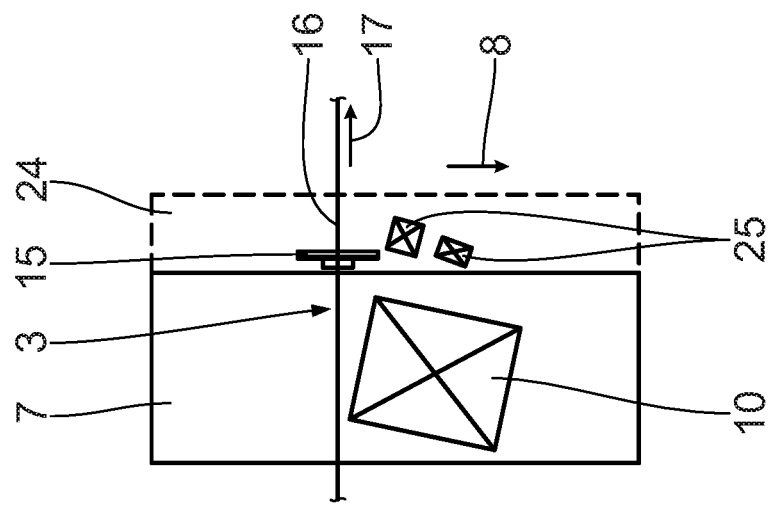
FIG. 7 is a top view of the arrangement according to FIG. 6.
Figure 6:
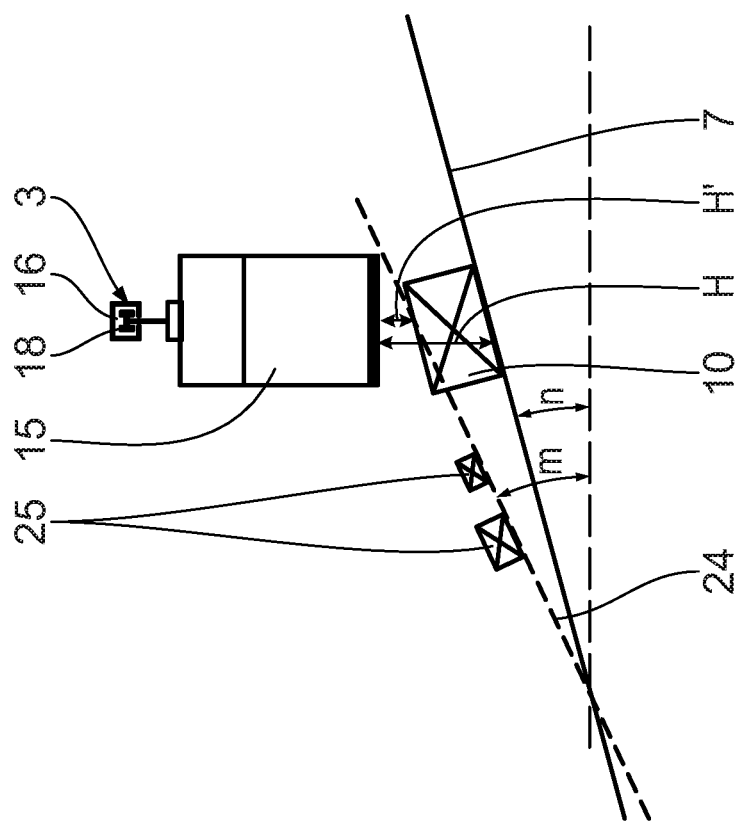
FIG. 6 is a view corresponding to FIG. 3 of a further embodiment with an additional ramp for the overhead conveyor provided at the delivery point.

FIGS. 6 and 7 show a further realization of a lying conveyor 2. Components which correspond to those explained above with reference to FIGS. 1 to 5 bear the same reference numerals and will not be discussed again in detail.

The essential difference in relation to the previous exemplary embodiments consists in that an additional ramp 24 is provided for the delivery of the overhead conveyor goods at the ramp 7. The additional ramp 24 extends parallel to the ramp 7 along the conveyor portion conveying direction 8. The additional ramp 24 extends, in particular, transversely and, in particular, perpendicularly to the overhead conveying direction 17. The overhead conveyor goods 25 can be delivered directly onto the additional ramp 24 from the transport pockets 15. The additional ramp 24 is arranged, in relation to the horizontal, at an angle of inclination m which is greater than the angle of inclination n of the ramp 7. This ensures that the drop height H' from the transport pocket 15 onto the additional ramp 24 is reduced and the risk of damage and/or destruction is excluded. The reduced drop height H', which is reduced in relation to the theoretical drop height H, is made possible as a result of the additional ramp 24. The theoretical drop height is produced from the distance between the transport pocket 15 and the ramp 7. Said distance is necessary so that the lying conveyor goods 10 are able to be conveyed reliably on the ramp 7 below the transport pockets 15.

Figure 8:
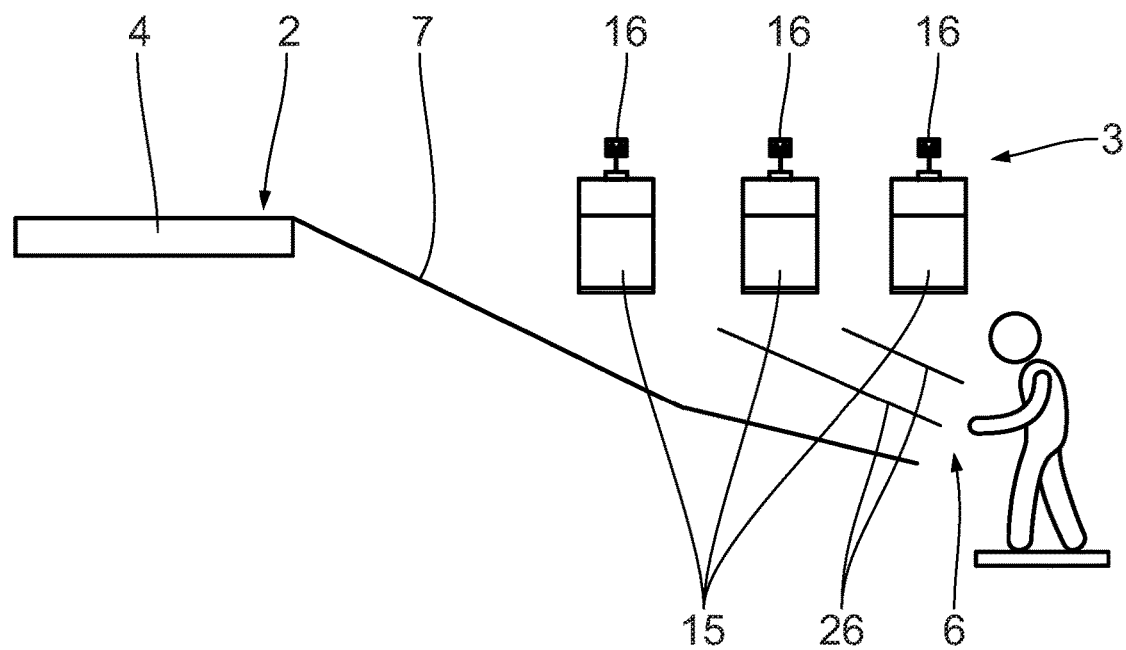
FIG. 8 is a view corresponding to FIG. 3 according to a further embodiment with delivery storage elements in the form of additional ramps at a delivery point.

FIG. 8 shows a further realization of a lying conveyor 2. Components which correspond to those explained above with reference to FIGS. 1 to 7 bear the same reference numerals and will not be discussed again in detail.

According to said embodiment, the overhead conveyor 3 comprises three parallel conveyor rails 16. Transport pockets 15 can be conveyed along each of the conveyor rails 16.

The conveyor rail shown on the left-hand side in FIG. 8 serves for delivering overhead conveyor goods 25 from the transport pocket 15 onto the ramp 7. In order to ensure separation of the overhead conveyor goods 25 on the various conveyor rails 16, delivery storage elements are provided for each of the two additional conveyor rails 16. The delivery storage elements are each realized as additional ramps 26. The additional ramps 26 are realized separately from the ramp 7 of the sorter 5. The overhead conveyor goods 25 can be stored intermediately on said additional ramps 26. In particular, overhead conveyor goods 25 are separated spatially from the goods on the ramp 7. A logical distinction between the goods at the delivery point is possible as a result. In particular, the operator is able to remove the goods delivered to the delivery storage elements and stored intermediately directly from there. At the delivery point 6, the operator has the choice of three different ramps 7, 26 which are separated from one another. According to the exemplary embodiment shown, the delivery storage elements are each arranged above the ramp 7 of the sorter 5. It is conceivable for the two delivery storage elements 26 to be arranged side by side, but above the ramp 7. It is also conceivable for them to be arranged, similarly to the additional ramp 24 according to FIGS. 6, 7, laterally next to the ramp 7.

It is also conceivable to bring the outlets of the ramps 7 and 26 together in order to make all goods available to the operator at a common outlet at the delivery point 6.

Figure 9:
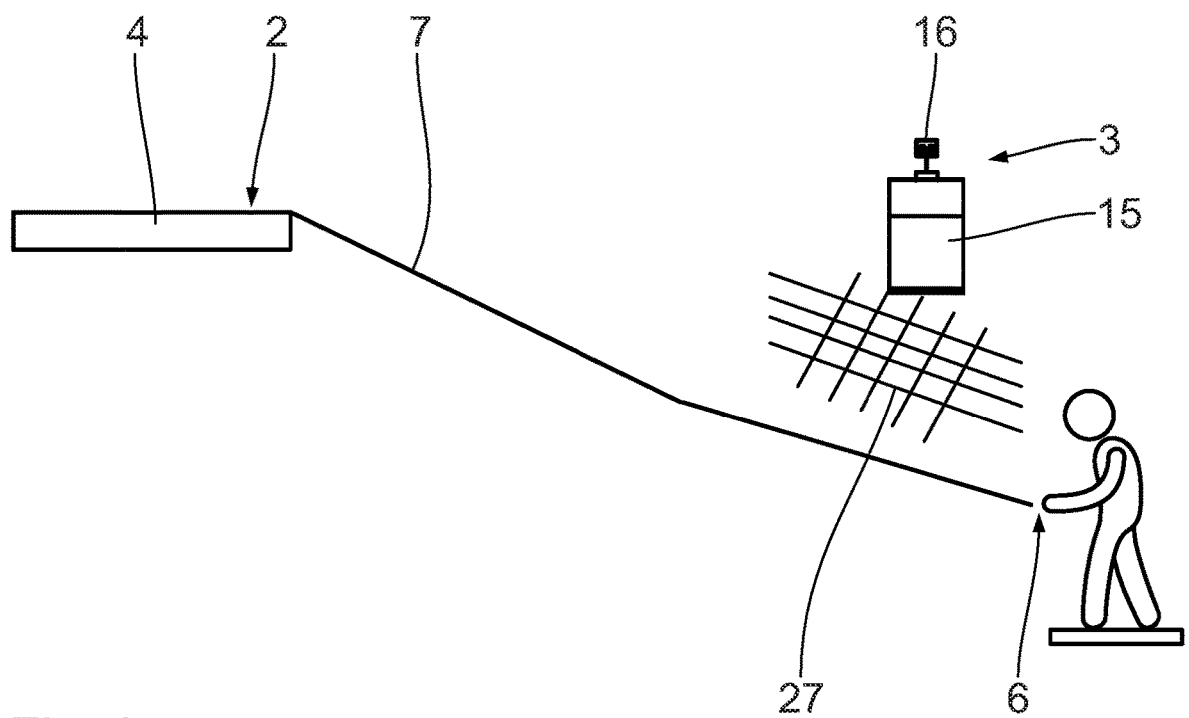
FIG. 9 is a view corresponding to FIG. 8 with a delivery storage element in the form of a net.

FIG. 9 shows a further embodiment of a lying conveyor 2. The essential difference in relation to the realization according to FIG. 8 consists in that the delivery storage element is realized in the form of a safety net 27 which is arranged above the ramp 7 in particular so as to be height-adjustable. The safety net is flexible so that damage and/or destruction of the overhead conveyor goods 25 when they fall out of the transport pocket 15 is excluded. The operator can remove the overhead conveyor goods 25 directly from the safety net at the delivery point 6.

Figure 10:
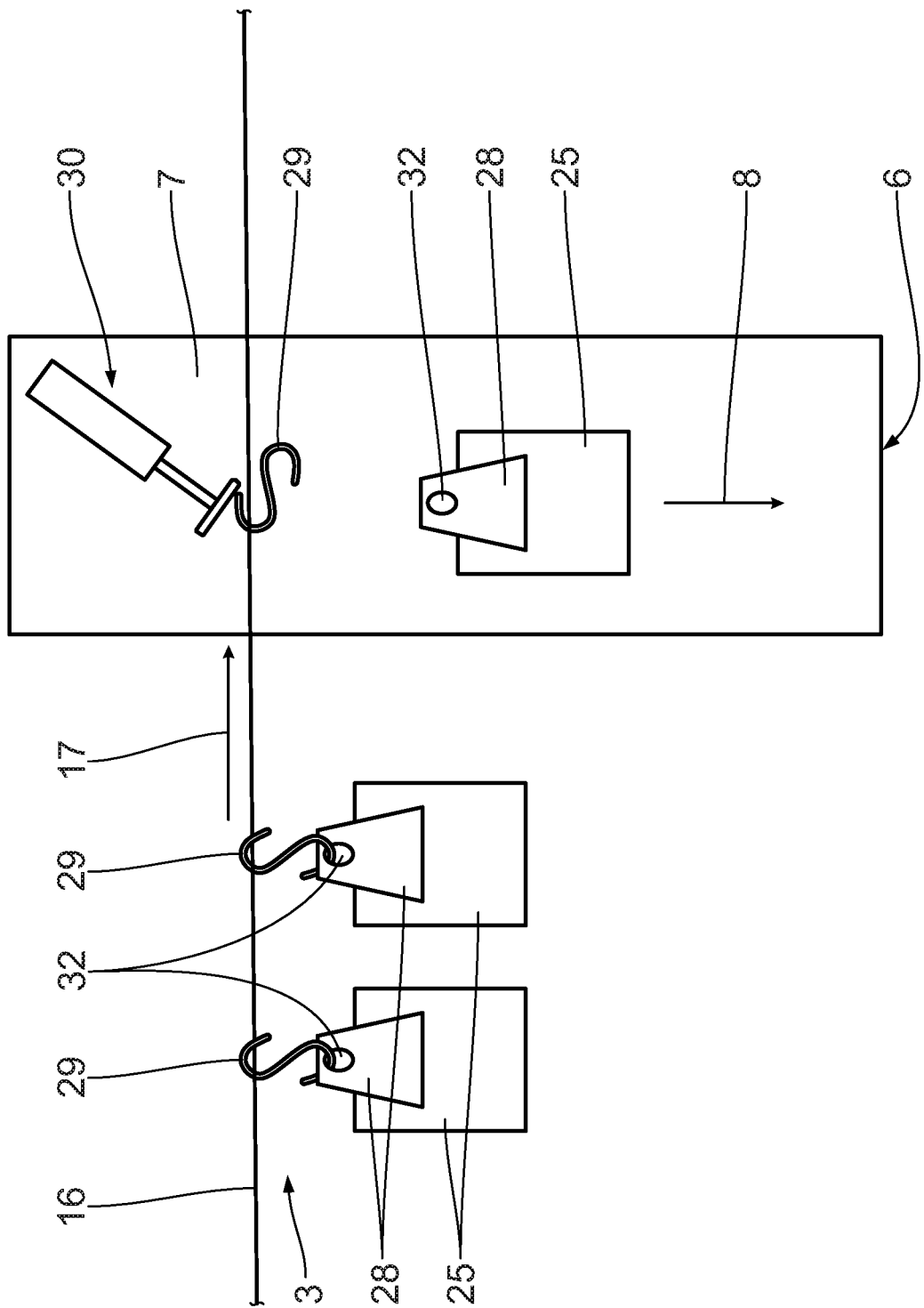
FIG. 10 is a schematic view of an embodiment of the overhead conveyor with a carrier label as goods carrier, a hook being actuated by means of an uncoupling unit in order to uncouple the goods carrier from the hook.

FIG. 10 shows a further realization of a conveyor system 1. Components which correspond to those already explained above with reference to FIGS. 1 to 9 bear the same reference numerals and will not be discussed again in detail.

In the case of the exemplary embodiment shown, the goods carrier is realized as a carrier label 28. The carrier label 28 is fastened, in particular glued, directly to the overhead conveyor goods 25 or to the packaging thereof. The carrier label 28 comprises an opening, through which a transport hook 29 is guided. The overhead conveyor goods 25 can be conveyed suspended on the transport hook 29 by means of the carrier label 28.

An uncoupling element 30 is arranged in the region of the ramp 7. According to the exemplary embodiment shown, the uncoupling element 30 is a linear actuator, in particular a pneumatic cylinder, a hydraulic cylinder or an electric linear drive. The transport hook 19 can be pivoted on the conveyor rail 16 by the uncoupling element 30 in such a manner that the carrier label 28 is uncoupled from the transport hook 29 and automatically falls onto the ramp 7 on account of gravity. The uncoupling element 30 can also be a rotary actuator which rotates the transport hook 29 on the conveyor rail 16 in such a manner that the overhead conveyor goods 25 with the carrier label 28 are uncoupled from the transport hook 29.

Figure 11:
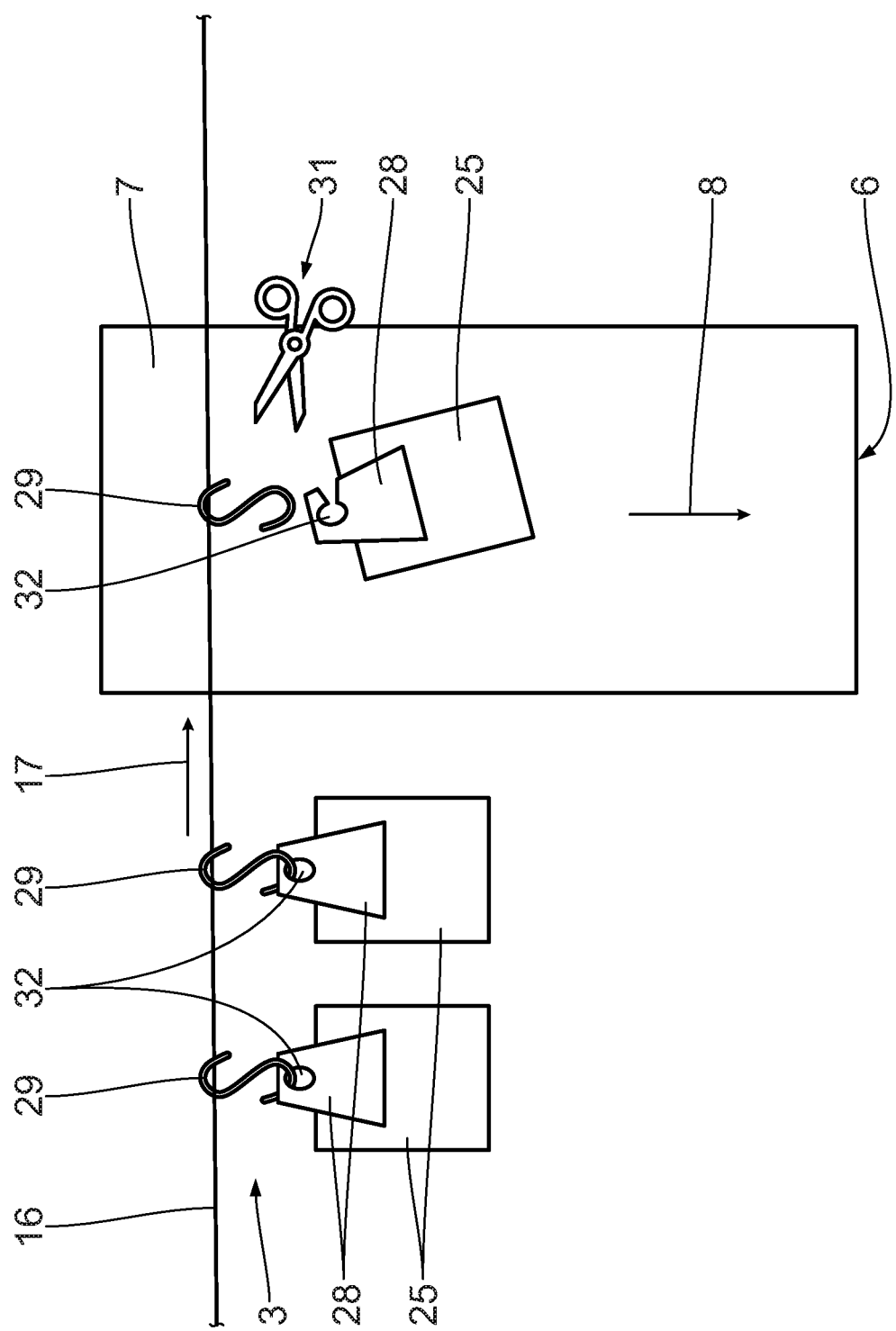
FIG. 11 is a view corresponding to FIG. 10 where the uncoupling unit is realized as a cutting unit.

FIG. 11 shows a realization of a conveyor system 1. Components which correspond to those already explained above with reference to FIGS. 1 to 10 bear the same reference numerals and will not be discussed again in detail.

The difference to the previous exemplary embodiment consists in that for delivering the overhead conveyor goods 25 at the ramp 7, the uncoupling element 31 is realized as a cutting unit. The cutting unit opens the carrier label 28 in the region of the through opening 32, through which the transport hook 29 is guided. The overhead conveyor goods 25 can fall downward onto the ramp 7 on account of gravity. The cutting unit 31 can be realized as a mechanical cutting unit and/or as a laser cutting unit.

Figure 12:
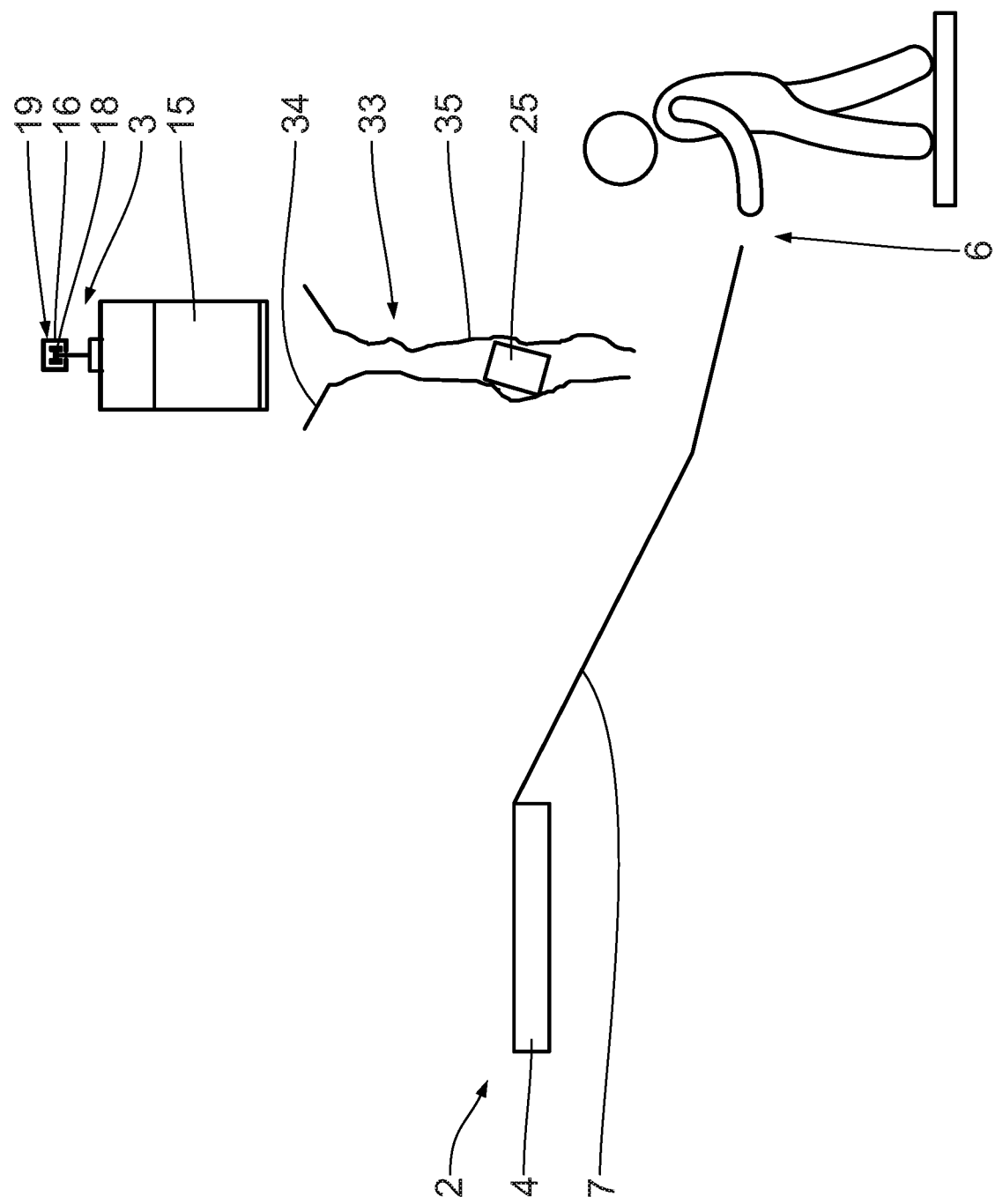
FIG. 12 is a view corresponding to FIG. 8 with a braking element for goods delivered to the delivery point from the overhead conveyor.

FIG. 12 shows a further realization of a conveyor system 1. Components which correspond to those explained above with reference to FIGS. 1 to 11 bear the same reference numerals and will not be discussed again in detail.

A braking element 33 is provided in the region of the delivery points 6 for the conveyor strand 19 of the overhead conveyor 3 in order to reduce the rate of fall of the overhead conveyor goods 25 and to avoid damage and/or destruction of the overhead conveyor goods 25 when they contact the ramp 7. One braking element 33 is provided, in particular, at each ramp 7 for each conveyor strand 19. By braking the rate of fall, it is possible to drop the overhead conveyor goods 25 from a greater height. Installation spaces which have remained unutilized up to now in a typical conveyor system are able to be opened up as a result.

According to the exemplary embodiment shown, the braking element 33 comprises, on its top side which faces the transport pocket 15, an insertion funnel 34 in order to ensure the overhead conveyor goods 25 are reliably delivered into the braking element 33. A textile hose 35 is connected to the insertion funnel 34. The textile hose 35 comprises, in particular, two oppositely arranged textile paths which are connected together in a flexible, in particular resilient, manner. The vertical fall rate of the overhead conveyor goods 25 is braked as a result of the expansion of the connecting elements connecting the textile paths and of the friction between the overhead conveyor goods 25 and the inside surface of the textile hose 35. This ensures that the overhead conveyor goods 25 do not fall vertically downward through the textile hose 35 in a non-braked manner. The textile hose 35 comprising sufficient flexibility and elasticity prevents the overhead conveyor goods 25 from causing a blockage in the textile hose 35. The textile hose 35 is realized similarly to a hose for rescuing persons, as used for rescuing persons from greater heights.

Figure 13:
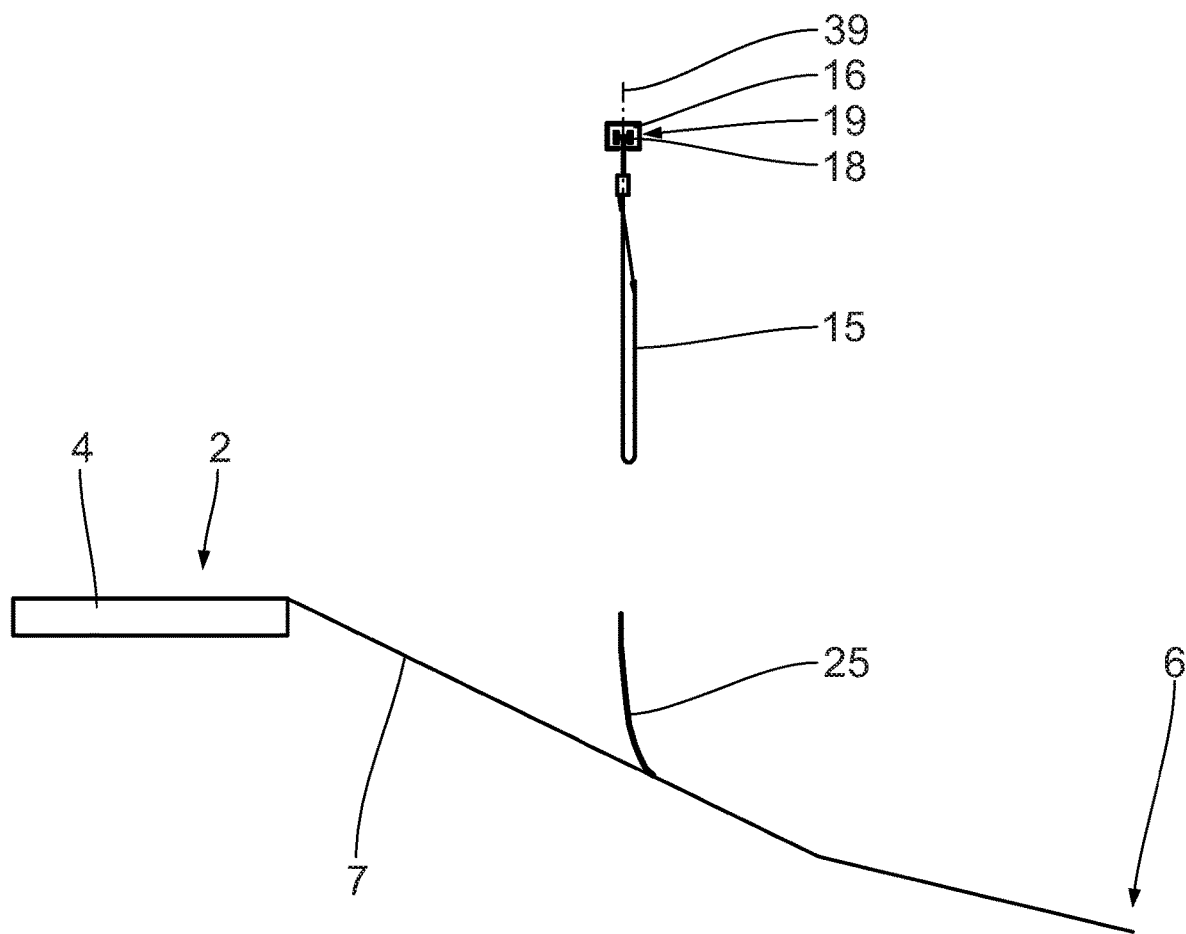
FIG. 13 is a schematic side view, corresponding to FIG. 3, of the overhead conveyor, the transport pocket being rotated about a vertical axis for delivery of the goods.

FIG. 13 shows a further realization of the conveyor system 1. Components which correspond to those already explained above with reference to FIGS. 1 to 12 bear the same reference numerals and will not be discussed again in detail.

The essential difference in relation to the previous exemplary embodiments consists in that the transport pocket 15 is arranged rotated by 90° about a vertical axis 39 for the delivery of the overhead conveyor goods 25, in particular in the form of postal items, in particular envelopes. This makes it possible for the delivered overhead conveyor goods 25 to contact the ramp 7 in a substantially linear manner. Damage to the overhead conveyor goods 25 caused by contacting the ramp 7 is substantially excluded. In the case of the conveyor pocket being arranged in a non-rotated manner, as is shown, for example, in FIG. 3, the overhead conveyor goods, in particular if this is an envelope, would contact the ramp 7 in a substantially punctiform manner. As a result, the envelope could be damaged in a corner region. The risk of damage to the overhead conveyor goods 25 is avoided as a result of rotating the pocket 15.

Rotating the transport pocket 15 about the vertical axis 39 can be effected by a passive stop element and/or an active drive, in particular directly at the transport pocket 15.

Figure 14:
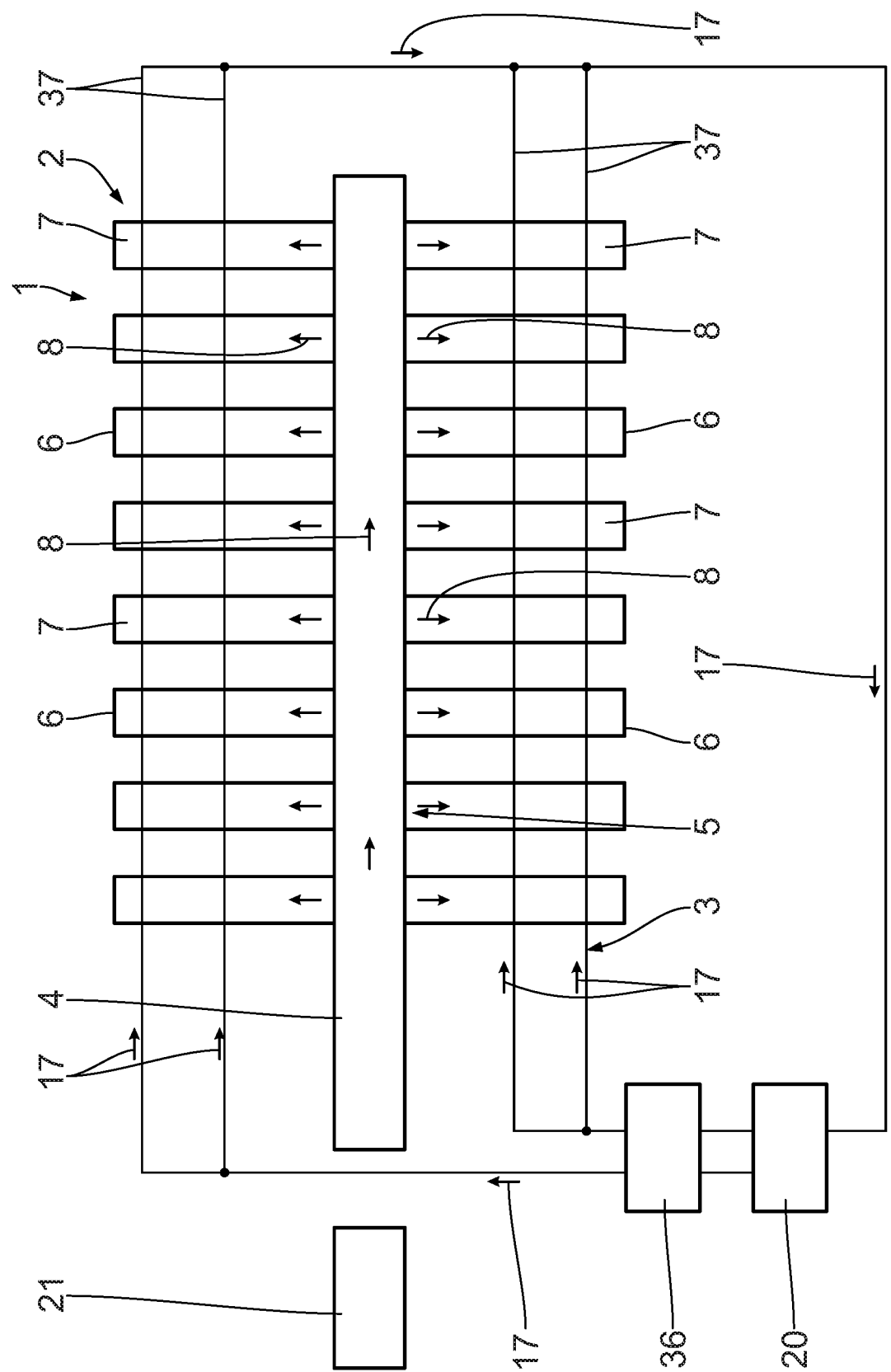
FIG. 14 is a schematic view, corresponding to FIG. 1, of a conveyor system with multiple conveyor strands for different groups of delivery points.

FIG. 14 shows a further realization of a conveyor system 1. Components which correspond to those already explained above with reference to FIGS. 1 to 13 bear the same reference numerals and will not be discussed again in detail.

In the case of the conveyor system 1 according to FIG. 14, the overhead conveyor 3 comprises two conveyor strands 19, each of which is assigned to a group of delivery points 6, that is to say each is connected to a group of delivery points 6 using conveyor technology. According to the exemplary embodiment shown, the ramps arranged in each case on the left-hand side of the conveyor portion 4 with the delivery points 6 arranged thereon are combined to form a first group of delivery points 6. Correspondingly, the delivery points arranged on the right-hand side of the conveyor portion 4 are combined to form a second group of delivery points 6. In each case, a conveyor strand 19 is connected to the first group of delivery points 6 using conveyor technology and the other conveyor strand 19 is connected to the second group of delivery points using conveyor technology. In order to enable said division of the overhead conveyor goods 25 to the two conveyor strands 19, a distributor module 36 is connected downstream of the overhead conveyor feed point 20. According to the exemplary embodiment shown, the feed point 21 is connected downstream of the distributor module 36. It is also conceivable for the feed point 21 to be arranged upstream, with reference to the overhead conveying direction 17, with reference to that of the distributor module 36.

A further difference consists in that each of the conveyor strands 19 comprises multiple part conveyor strands 37. The throughput rate of the conveyor system 1 can be additionally raised by way of the part conveyor strands 37. The part conveyor strands 37 are advantageous, in particular, whenever the conveyor pockets 15 are conveyed in the arrangement shown in FIG. 13, that is to say rotated about a vertical axis 39. In said rotated arrangement, an increased distance between the pockets is necessary so that the throughput of goods along one single conveyor strand would be reduced. By multiple, in particular at least two, in particular at least three and in particular at least four part conveyor strands being provided instead of one single conveyor strand, a high throughput of goods is ensured even with transport pockets 15 which have been rotated by 90°.

While specific embodiments of the invention have been shown and described in detail to illustrate the application of the principles of the invention, it will be understood that the invention may be embodied otherwise without departing from such principles.

What is claimed is:

1. A conveyor system for conveying goods, the conveyor system comprising:
    a lying conveyor for conveying the goods lying on the lying conveyor, wherein the lying conveyor comprises a conveyor portion and a sorting device arranged downwards with respect to the conveyor portion, wherein the sorting device comprises multiple delivery points at which the lying conveyor goods are provided in a sorted manner; and
    an overhead conveyor, by way of which overhead conveyor goods are conveyed in a suspended manner on a goods carrier, wherein the overhead conveyor is connected to at least one of the delivery points such that the overhead conveyor goods are delivered directly from said goods carrier to the at least one delivery point.

2. The conveyor system according to claim 1, wherein the overhead conveyor extends at least in regions above the at least one of the delivery points of the lying conveyor, wherein the lying conveyor goods are different from the overhead conveyor goods.

3. The conveyor system according to claim 1, wherein the goods carrier is configured as a transport pocket in which the overhead conveyor goods are conveyed.

4. The conveyor system according to claim 3, wherein the transport pocket is further configured such that the transport pocket is emptiable.

5. The conveyor system according to claim 3, wherein the transport pocket is further configured to be rotatable about a vertical axis.

6. The conveyor system according to claim 5, wherein the transport pocket is further configured be rotationally driveable about a vertical axis.

7. The conveyor system according to claim 1, further comprising at least one feed point, at which the goods are fed to at least one of the lying conveyor and the overhead conveyor.

8. The conveyor system according to claim 1, further comprising at least one overhead conveyor feed point, at which exclusively overhead conveyor goods are fed to the overhead conveyor.

9. The conveyor system according to claim 1, further comprising at least one overhead conveyor delivery point, at which exclusively overhead conveyor goods are delivered from the overhead conveyor.

10. The conveyor system according to claim 1, wherein the sorting device comprises ramps for conveying the goods to the delivery points.

11. The conveyor system according to claim 1, wherein a braking element is provided for the overhead conveyor goods at at least one of the delivery points.

12. The conveyor system according to claim 11, wherein the braking element is provided for the goods delivered from the overhead conveyor.

13. The conveyor system according to claim 1, wherein the overhead conveyor comprises at least one conveyor strand which extends along the delivery points.

14. The conveyor system according to claim 13, wherein the at least one conveyor strand extends sequentially along the delivery points.

15. The conveyor system according to claim 1, wherein the overhead conveyor comprises multiple conveyor strands which are each connected to a group of delivery points using conveyor technology.

16. The conveyor system according to claim 1, further comprising a lying conveyor basic structure, by way of which the lying conveyor is supported on the floor, wherein the overhead conveyor is supported on the lying conveyor basic structure.

17. The conveyor system according to claim 16, wherein by way of the lying conveyor basic structure one of a conveyor portion and the ramps is supported on the floor.

18. The conveyor system according to claim 1, wherein at least one delivery storage element is provided at each delivery point for the overhead conveyor goods.

19. The conveyor system according to claim 1, wherein the sorting device comprises several sorting lines, wherein each of the delivery points is arranged at an end of one of the sorting lines.

20. The conveyor system according to claim 1, wherein the overhead conveyor comprises at least one conveyor rail along which the goods carrier is conveyed, wherein the conveyor rail is arranged vertically above the at least one delivery point.

21. The conveyor system according to claim 1, wherein each delivery point is arranged at the end of one of said ramps.

22. A method for conveying goods, the method comprising the steps of:
    conveying lying goods to respective delivery points by a lying conveyor, the lying conveyor comprising a sorting device with one delivery point at an end region of each sorting line of the sorting device;
    conveying overhead conveyor goods in a suspended manner on a goods carrier by an overhead conveyor to at least one of the delivery points, the overhead conveyor goods being different from the lying goods;
    connecting the overhead conveyor to the at least one of the delivery points; and directly delivering the overhead conveyor goods from the goods carrier to the at least one of the delivery points at which the lying conveyor goods are provided in a sorted manner.

23. A conveyor system for conveying goods, the conveyor system comprising:
- a lying conveyor for conveying the goods lying on the lying conveyor, wherein the lying conveyor comprises a sorting device, the sorting device comprising several sorting lines, each of the sorting lines comprising at least one delivery point at which the lying conveyor goods are provided in a sorted manner, wherein the at least one delivery point is arranged at an end region of a respective sorting line; and
- an overhead conveyor, wherein overhead conveyor goods are configured to be conveyed via the overhead conveyor in a suspended manner on a goods carrier, wherein the overhead conveyor is connected to at least one of the delivery points such that the overhead conveyor goods are delivered directly from the goods carrier to the at least one of the delivery points.

* * * * *